US005725645A

United States Patent [19]

Wickland et al.

[11] Patent Number: 5,725,645

[45] Date of Patent: Mar. 10, 1998

[54] VENT ASSEMBLIES FOR WASTE DISPOSAL BAGS

[75] Inventors: Terry J. Wickland, Golden; Emily Brassell, Arvada, both of Colo.

[73] Assignee: Nuclear Filter Technology, Inc., Golden, Colo.

[21] Appl. No.: 751,739

[22] Filed: Nov. 18, 1996

[51] Int. Cl.[6] .................... B01D 46/30

[52] U.S. Cl. .................... 96/17; 55/385.4; 55/500; 55/510; 55/518; 220/371; 220/745; 220/DIG. 27

[58] Field of Search .................... 55/385.4, 512, 55/513, 516, 517, 518, 519, 510, 502; 96/17; 220/367.1, 371, 372, 745, DIG. 27

[56] References Cited

U.S. PATENT DOCUMENTS

| | | | |
|---|---|---|---|
| 3,130,025 | 4/1964 | Bowden et al. | 55/510 |
| 3,494,111 | 2/1970 | Hathaway et al. | 55/510 |
| 4,657,570 | 4/1987 | Gronholz et al. | 55/510 |
| 4,668,258 | 5/1987 | Steer | 55/385.4 |
| 4,957,518 | 9/1990 | Brassell | 55/316 |
| 4,957,522 | 9/1990 | Brassell | 55/385.4 |
| 5,193,709 | 3/1993 | Brassell | 55/510 |
| 5,353,949 | 10/1994 | Seibert | 55/385.4 |
| 5,431,974 | 7/1995 | Pierce | 55/385.4 |

*Primary Examiner*—Duane S. Smith
*Attorney, Agent, or Firm*—Millen, White, Zelane, & Branigan, P.C.

[57] ABSTRACT

A vent assembly useful for venting bags containing radioactive waste material includes a base plate with a chamber projecting therefrom and a cap plate which has a center portion that snap fits over the chamber. The base plate and cap plate have flange portions which overlie the inner and outer surfaces of the bag to secure the vent to the bag by clamping against the wall of the bag. A ring is snap fitted into the chamber prior to snap fitting the cap plate to the base plate and a compressible mass of fibrous filter material is contained within the ring. The filter material may be selected from a number of filter materials such as spun polyester, activated carbon felt, fibrous cellulose or sintered stainless steel fibers. Preferably, the filter material is electrically charged, fibrous polymer material.

10 Claims, 2 Drawing Sheets

VENT ASSEMBLIES FOR WASTE DISPOSAL BAGS

FIELD OF THE INVENTION

The instant invention relates to vent assemblies and, more particularly, to a vent assemblies for containers such as bags.

BACKGROUND OF THE INVENTION

Disposing of hazardous waste has become a critical problem in modern societies. One proposal is to contain hazardous waste in plastic containers, such as plastic bags, either temporarily or permanently, for storage or disposal. If the waste contains and/or emits innately hazardous gases, then the safety of storing hazardous waste in plastic containers or the like is compromised.

Nuclear waste materials emitting relatively low-level but still dangerous amounts of radiation, are contained in walled containers, such as plastic bags. It is desirable to vent the bags in order to minimize the danger of gases building up in and perhaps bursting the bags. Since the bags are vented to the atmosphere, the gases may carry with them minute radioactive particles which pose a serious health hazard when they are inhaled. It is, therefore, very important to properly filter the gases venting from storage bags for nuclear waste. Bags for storing other waste are also preferably vented.

In order to save storage space, bags containing radioactive waste are evacuated to reduce their volume. When using the carbon block filters in vents, such as the vents of U.S. Pat. No. 4,957,518, evacuation is very slow because the carbon blocks drastically restrict air flow. Accordingly, the process of storing nuclear waste in bags is prolonged, increasing expense and the danger of unintended discharges of radioactive material into the atmosphere.

In view of the aforedescribed problems in storing waste materials, there is a need for a safe, durable and convenient way to vent containers and bags while minimizing the risk of releasing radioactive particles or other contaminants into the atmosphere.

SUMMARY OF THE INVENTION

This invention minimizes the risks in venting containers such as plastic bags containing materials which may contain or release gases containing dangerous contaminants. The invention also provides a convenient assembly for retaining filter materials in a vent assembly which is mounted through the wall of a storage bag.

The invention is directed to a vent assembly for mounting in an opening through a wall. The vent assembly includes a base plate positioned on one side of the wall in alignment with the opening. The base plate has an annular wall projecting therefrom for extending through the opening in the wall. The annular wall defines a chamber and the base plate has an array of through-holes in alignment with the chamber. A ring is fitted into the chamber. The ring defines a space therein in which a compressible mass of fibrous material is disposed for filtering fluid which passes through the vent. A cap plate having a second flange portion and a perforated center portion cooperates with the base plate to enclose the ring within the chamber of the base plate so as to retain the compressible fibrous material within the space of the ring. A flange portion on the cap plate is in alignment with a flange portion on the base plate and seals are disposed between the flange portions for sealing engagement with opposite surfaces of the wall of the container adjacent the opening.

In a more specific aspect, the compressible mass of material used in the vent assembly is selected from the group consisting of fibrous polymer filter material, strands of sintered stainless steel, cellulose fibers, activated carbon felt and KELAR polyamide strands.

In a preferred embodiment, the compressible mass of material is an electrostatically charged mesh of material such as a filter media fiberglass polymer material known as FILTRETE® available from the 3M Company.

The instant invention further contemplates the combination of a container, such as a bag or the like; a filter, such as the aforedescribed filter, and a filter-mounting assembly, such as the aforedescribed assembly.

Upon further study of the specification and appended claims, further objects and advantages of this invention will become apparent to those skilled in the art.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
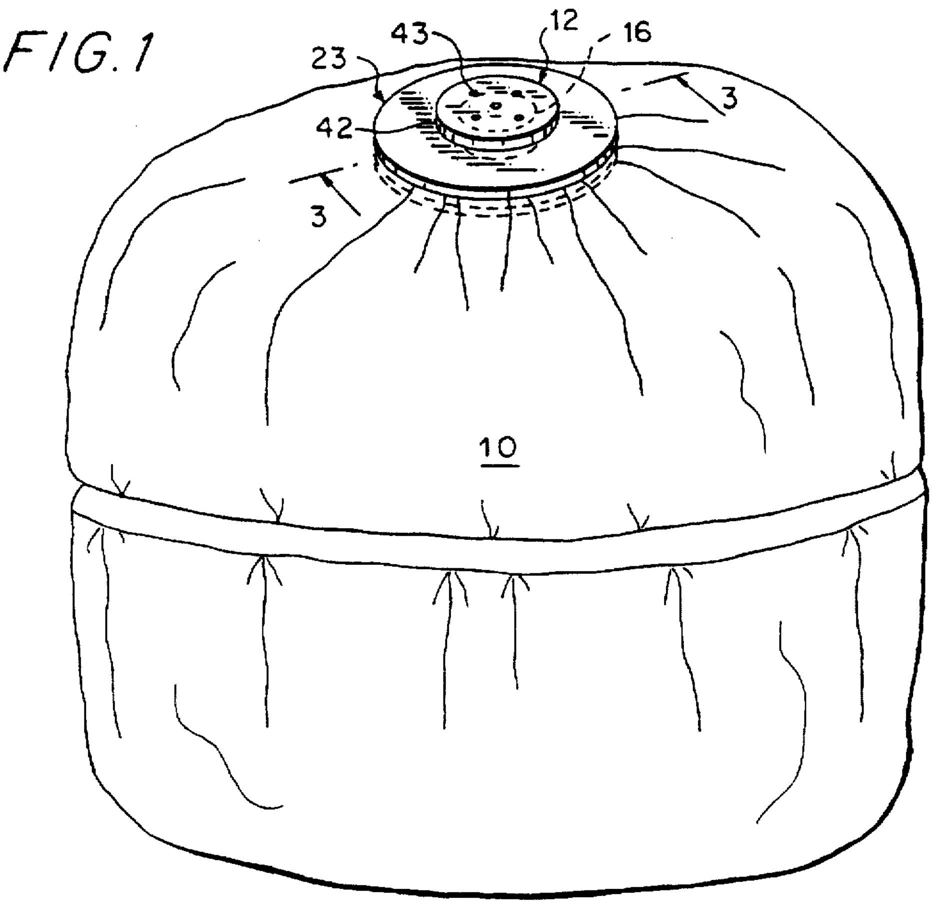
FIG. 1 is a perspective view showing a waste-containing bag vented through a filter assembly configured in accordance with the principles of the present invention.

Referring now to FIG. 1, there is shown in a plastic bag, designated generally by the numeral 10, which stores waste material, such as nuclear waste material. The bag may be any size, e.g., a 1 to 2-gallon bag or a 15 or 20 gallon bag. The contained material is in the form of particles, granules, powders or other solids which have interstices which contain fluids such as gases, e.g., air or other gases. These fluids also have suspended therein hazardous waste in the form of, for example, radioactive particles, gas or liquids. In order to avoid swelling and bursting of the plastic bags 10 due to storage of hazardous materials over long periods of time, it is desirable to provide the bags with at least one vent assembly 12 to relieve pressure. Pressure elevation is an especially serious problem with nuclear waste storage because gases from nuclear waste materials may contain radioactive particles. It is, of course, not desirable to release these gases into the atmosphere, e.g., since they can be inhaled or otherwise ingested, increasing cancer risks. The present invention minimizes this danger by filtering vent gases with a low resistance filter media 13 (see FIGS. 2 and 3).

Figure 2:
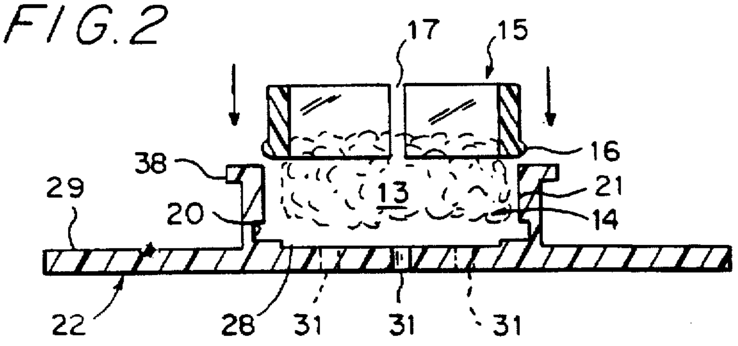
FIG. 2 is an exploded elevation showing a retaining ring for securing filter media within an annular wall of a base plate used with the filter assembly of FIG. 1.
Figure 3:
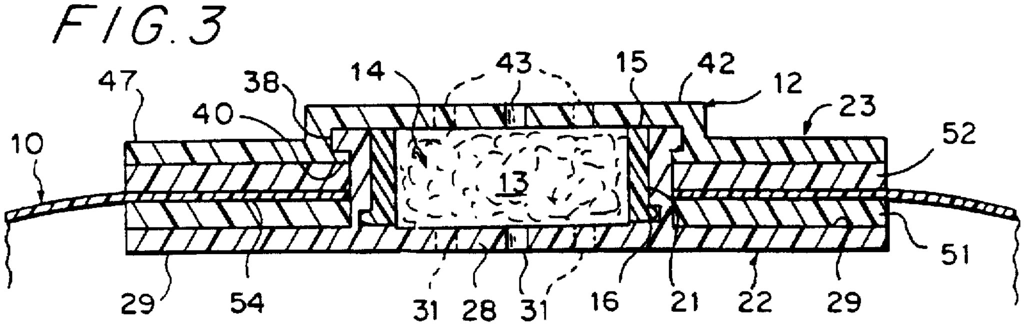
FIG. 3 is an elevation of the vent assembly taken along Line 2—2 of FIG. 1.
Figure 4:
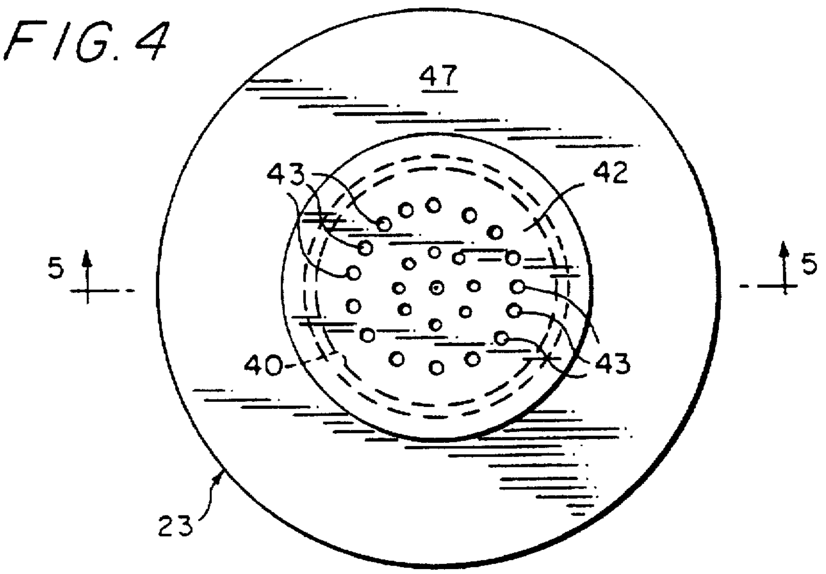
FIG. 4 is a top view of a cap plate comprising a portion of the vent assembly.
Figure 5:
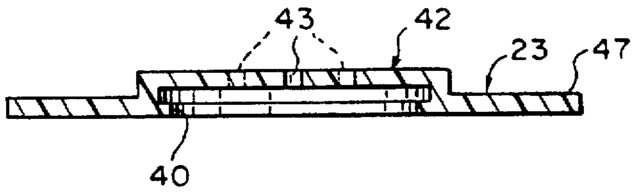
FIG. 5 is an elevation of the cap plate taken along Line 5—5 of FIG. 4.

Referring now more specifically to FIGS. 2 and 3, it is seen that a filter media 13 is preferably in the form of a wad or batt of fibrous material, which wad is compressible and is preferably at least slightly resilient so as to expand when not compressed. Examples of such media are fibrous polymer filter materials such as spun polyester, strands of sintered stainless steel, cellulose fibers, actuated carbon felt, KEVLAR® strands and various composites. In accordance with a preferred embodiment, the filter media 13 is made of a polymeric strand material which is electrically charged. Exemplary of such a polymer strand material is a filter media manufactured by the 3M Company and known as FILTRETE® material. This stand material is charged by a corona changer to carry a permanent static electric charge. FILTRETE® material is available in grades G-100, G-200 and G-300. The preferred grade for the present invention is G-300.

In order to reduce the space occupied by the bag 10, air is evacuated from the bag through the vent 12 after the bag has been filled with solid waste by applying a vacuum nozzle to the vent. Since the filter media 13 has low resistance due to its strand configuration, very rapid evacuation of the bag 10 is achieved. When thousands of bags 10 are being stored, rapid evacuation saves considerable time and expense as well as reducing the chance that an unstored bag will discharge to the atmosphere.

As is best seen in FIG. 2, the filter media 13 is retained with a chamber 14 by a ring 15. The ring 15 surrounds the wad of filter media 13. The ring 15 has an annular rib 16 at the lower end thereof which snap fits into an annular groove 20 in an annular wall 21 defining the round chamber 14. By using the ring 15, very rapid assembly of the vents 12 is achieved because the batts of filter media 13 are firmly held in place within the annular wall 21. This is because, as is seen in FIG. 3, the bottom portion of the matt of filter material 13 is clamped between the bottom of the ring 15 and base plate 22. Preferably, the ring 15 is a split ring with a gap 17, so that the ring has a relaxed diameter larger than the inner diameter of the annular wall 21. Accordingly, the rib 16 of the ring 15 snaps into the groove 20 when the ring is squeezed to reduce its diameter and is pressed down into the round chamber 14.

The annular wall 21 extends from a circular base plate 22 and projects through an opening in the bag 10. Thereafter, a circular cap plate 23 is fixed to the annular wall 21 to hold the vent assembly 12 together and to firmly fix the vent assembly to the bag 10 by clamping the wall of the bag between the base plate 22 and cap plate 23 (see FIGS. 1, 3, 4 and 5).

Figure 6:
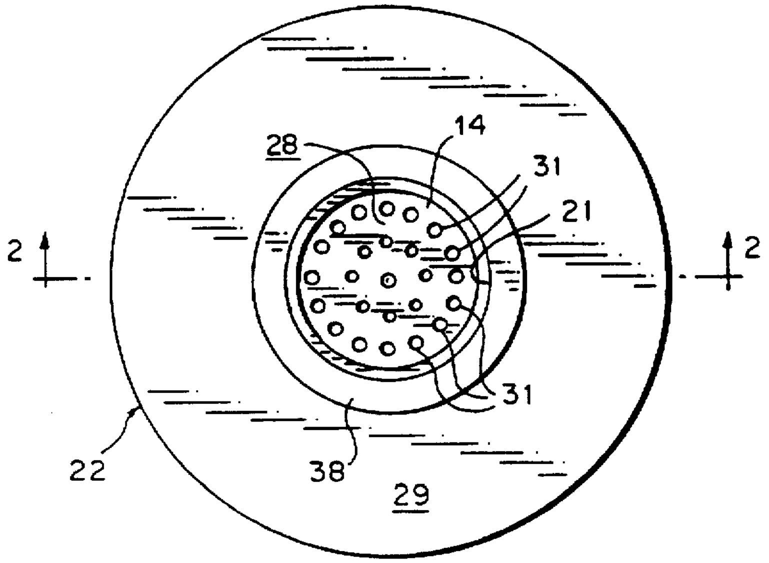
FIG. 6 is a top view of a base plate forming a portion of the assembly of FIG. 3.

As is seen in FIG. 6, the wall 21 is preferably concentric with the circular base plate 22 and divides the base plate into a vent portion 28 and a base flange 29. The vent portion 28 forms the bottom of chamber 14 while, as will be explained hereinafter, portions of the wall of bag 10 adjacent the vent opening overlie the base flange 29. The vent portion 28 has a plurality of ports 31 therethrough so that gases within the bag 10 exhaust from the bag into the chamber 14 as pressure rises.

The projecting annular wall 21 has a lip 38 projecting radially therefrom and extending completely therearound. The lip 38 cooperates with a second lip 40 on the cap plate 23 (see FIGS. 3 and 4) to retain the cap plate in place over the ring 15. The cap plate 23 has a raised area 42 which has a plurality of ports 43 which allow gas which has been filtered by the filter element 13 to vent into the atmosphere. Any radioactive particles or particles which may have radioactive debris thereon are trapped in the filter media 13 so that gas escaping from the bag 10 is relatively free of particle born radiation. The cap plate 23 has a cap flange 47 which complements the base flange 29 of the base plate 22 by overlying the base flange when the vent assembly 10 is snapped together.

Disposed between the cap flange 47 and the base flange 28 are first and second gaskets 51 and 52, respectively, which are made of a resilient resinous material. The portion 54 of the bag 10 adjacent the vent assembly 12 is clamped between the gaskets 51 and 52 to provide a gas-tight and liquid-tight seal.

In one embodiment of the invention, the entire assembly has a diameter of approximately 2¼ inches. The thickness of each assembly is approximately ⅝ inch. The cap plate 23 and base plate 22 are made of corrosion-resistant, relatively stiff, resilient resinous material so that the plates snap together with the lip 38 snapping over lip 40 when the two plates are pressed together. The lips 38 and 40 can be made readily deformable, e.g., by providing a thickness and length of about 1/32 of an inch. Of course, none of these dimensions is critical, nor is the overall size, but for a given application is chosen appropriately using routine considerations. Similarly, the shape of the assembly of this invention is not critical, e.g., it is need not necessarily be circular.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A vent assembly for mounting in an opening through a wall wherein the vent assembly comprises:

a base plate for positioning on one side of the wall in alignment with the opening, the base plate having an annular wall projecting therefrom for extending through the opening in the wall and for defining a chamber, the base plate having an array of through-holes in alignment with the chamber and a first flange portion;

a ring fitted into the chamber, the ring defining a space therein;

a compressible mass of fibrous material within the ring for filtering fluid which passes through the vent;

a cap plate having a second flange portion and a perforated center portion, the cap plate cooperating in fixed relation with the base plate to enclose the ring within the chamber of the base plate to retain the compressible fibrous material within the space in the ring, the second flange portion on the cap being in alignment with the first flange portion on the base plate; and sealing means disposed between the first and second flange portions for sealing engagement with opposite surfaces of the wall adjacent the opening.

2. The vent assembly of claim 1, wherein the compressible mass of fibrous material is a fibrous polymer filter material.

3. The vent assembly of claim 2, wherein the fibrous polymer filter material is spun polyester.

4. The vent assembly of claim 1, wherein the compressible mass of material is selected from the group consisting of fibrous polymer filter material, strands of sintered stainless steel, cellulose fibers, activated carbon felt and polyamide strand material.

5. The vent assembly of claim 1, wherein the compressible mass of fibrous materials is electrically charged.

6. The vent assembly of claim 1, wherein the ring snap fits into the chamber.

7. A vent assembly for mounting in an opening through a wall of a container wherein the vent assembly comprises:

a base plate for positioning on one side of the wall in alignment with the opening, the base plate having an annular wall projecting therefrom for extending through the opening in the wall and for defining a chamber; the base plate having a first flange portion and an array of through-holes in alignment with the chamber and the wall having an annular groove therein;

a ring fitted into the chamber, the ring defining a space therein and having a projecting rim snap fitted into the annular groove in the annular wall of the base plate;

a compressible mass of fibrous, electrically charged, polymer material within the ring for filtering fluid which passes through the vent;

a cap plate having a second flange portion and a perforated center portion, the cap plate cooperating in fixed relation with the base plate to enclose the ring within the chamber of the base plate to retain the compressible fibrous material within the space in the ring, the second flange portion on the cap being in alignment with the first flange portion on the base plate; and sealing means disposed between the first and second flange portions for sealing engagement with opposite surfaces of the wall adjacent the opening.

8. The vent assembly of claim 7, wherein the container is a bag.

9. The vent assembly of claim 8, wherein the vent assembly is rigid and is made of plastic material.

10. The vent assembly of claim 9, wherein the electrically charged fibrous filter media is Fiberglass polymer material.

* * * * *